(12) United States Patent
Kusumoto et al.

(10) Patent No.: US 7,378,767 B2
(45) Date of Patent: May 27, 2008

(54) AC DYNAMO ELECTRIC MACHINE WITH MAGNETIC RELUCTANCE PORTION LINKING ROTATIONAL POSITION DETECTOR TO AC DYNAMO ELECTRIC MACHINE BODY

(75) Inventors: Katsuhiko Kusumoto, Tokyo (JP); Yoshinobu Utsumi, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/498,307

(22) PCT Filed: Mar. 4, 2002

(86) PCT No.: PCT/JP02/01966

§ 371 (c)(1),
(2), (4) Date: Jun. 10, 2004

(87) PCT Pub. No.: WO03/075438

PCT Pub. Date: Sep. 12, 2003

(65) Prior Publication Data
US 2005/0077789 A1    Apr. 14, 2005

(51) Int. Cl.
*H02K 11/00* (2006.01)
*H02K 13/00* (2006.01)
*H02K 19/22* (2006.01)
(52) U.S. Cl. .................. 310/68 D; 310/68 R; 310/68 B
(58) Field of Classification Search .............. 310/68 D, 310/68 R, 263, 112
See application file for complete search history.

(56) References Cited
U.S. PATENT DOCUMENTS 4,772,815 A    9/1988   Harned et al. .............. 310/171
5,132,604 A *  7/1992   Shimane et al. ............. 322/10
5,955,807 A *  9/1999   Kajiura et al. ........... 310/156.66

(Continued)

FOREIGN PATENT DOCUMENTS

DE          100 06 223      *  8/2000

(Continued)

OTHER PUBLICATIONS

Translation of Tanaka, JP 03-155351, Jul. 1991.*

(Continued)

*Primary Examiner*—Tamai Karl
(74) *Attorney, Agent, or Firm*—Sughrue Mion, PLLC (57) ABSTRACT

An AC dynamo electric machine for a motor vehicle includes an AC dynamo machine body 100 composed of a rotor 10 constituted by a first rotatable shaft 12 supported rotatably by a pair of bearings 16, 17, a rotor core 8 fixedly secured to the first rotatable shaft 12 and a field winding 9 wound on the rotor core 8, a stator 3 composed of a stator core 1 disposed in opposition to the rotor 10 and a polyphase stator winding 2 wound on the stator core 1 and a bracket 80 supporting the pair of bearings 16, 17 and the stator 3, and a rotational position detector for the control purpose composed of a second rotatable shaft 30 coupled to the first rotatable shaft 12 through a large magnetic reluctance portion 32, 33, a second rotor 21 fixedly secured to the second rotatable shaft 30 and a second stator winding 22a for generating an output voltage based on rotation of the second rotor 21.

3 Claims, 5 Drawing Sheets

U.S. PATENT DOCUMENTS

| | | | |
|---|---|---|---|
| 6,437,477 B1* | 8/2002 | Krefta et al. | 310/263 |
| 2002/0158523 A1* | 10/2002 | Abadia et al. | 310/68 B |
| 2005/0077789 A1* | 4/2005 | Kusumoto et al. | 310/68 B |

FOREIGN PATENT DOCUMENTS

| | | | |
|---|---|---|---|
| FR | 02 806 224 A1 | | 9/2001 |
| JP | 63-234857 | * | 9/1988 |
| JP | 02-184239 | * | 7/1990 |
| JP | 03-155351 | * | 7/1991 |
| JP | 07 177 690 A | | 7/1995 |
| JP | 7-177690 A | | 7/1995 |
| JP | 08 308 156 A | | 11/1996 |
| JP | 8-308156 A | | 11/1996 |
| JP | 09 065 620 A | | 3/1997 |
| JP | 9-65620 A | | 3/1997 |
| JP | 3055444 B2 | | 4/2000 |
| JP | 2002-84724 A | | 3/2002 |
| JP | 2002084724 | * | 3/2002 |

OTHER PUBLICATIONS

Translation of Hallstrand, DE 100 06 223, Aug. 31, 2000.*
Translation of Morizaki, JP 63-234857, Sep. 30, 1988.*
Manual translation of Yamada (JP 02-184,239). "electric motor", Jul. 18, 1990.*

* cited by examiner

AC DYNAMO ELECTRIC MACHINE WITH MAGNETIC RELUCTANCE PORTION LINKING ROTATIONAL POSITION DETECTOR TO AC DYNAMO ELECTRIC MACHINE BODY

TECHNICAL FIELD

The present invention relates to an alternating current dynamo electric machine destined to be installed on a motor vehicle (hereinafter also referred to as the motor-vehicle-destined AC dynamo electric or simply dynamo machine only for the convenience of description) and capable of operating as an electric motor and an electric generator. More particularly, the present invention is concerned with a motor-vehicle-destined AC dynamo machine provided with a rotational position detector for the control purpose.

BACKGROUND TECHNIQUE

Figure 5:
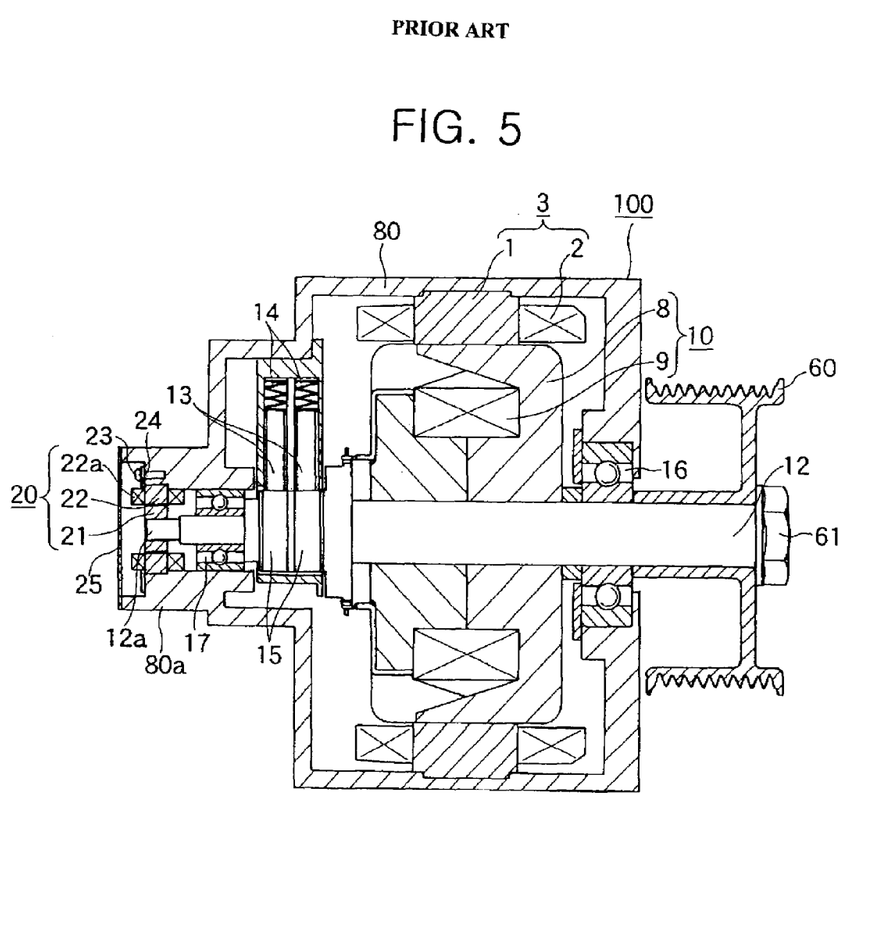
FIG. 5 is a sectional view showing a conventional motor-vehicle-destined AC dynamo electric machine provided with a control-dedicated rotational position detector.

FIG. 5 is a sectional view showing a conventional motor-vehicle-destined AC dynamo machine provided with a rotational position detector for the control purpose (hereinafter also referred to as the control-dedicated rotational position detector only for the convenience of description). This AC dynamo machine is equipped with a pulley 60 at a right-hand end portion, as viewed in FIG. 5, for making it possible to transmit bidirectionally a motive power with an engine. The pulley 60 is fixedly secured to a rotatable shaft 12 at one end portion thereof by means of a nut 61.

Mounted fixedly on the rotatable shaft 12 is a rotor core 8 which is wound with a field winding 9. The rotor core 8, the field winding 9 and the rotatable shaft 12 cooperate to constitute a rotor 10. Disposed in opposition to the rotor 10 is a stator core 1 which is wound with a polyphase stator winding 2. The stator core 1 and the polyphase stator winding 2 cooperate to constitute a stator 3.

The rotor 10 and the stator 3 are housed within a bracket 80. The rotor 10 is rotatably supported by a pair of bearings 16 and 17. The bearings 16 and 17 and the stator 3 are stationarily disposed internally of a bracket 80. Slip rings 15 are mounted on the rotatable shaft 12 on one side for the purpose of current supply to the field winding 9. A pair of brushes 13 are provided to slideably contact the slip rings 15, respectively. Further, a brush holder is provided in which springs 14 are accommodated for pressing the brushes 13 against the slip rings 15, respectively.

Furthermore, a resolver 20 designed to serve as the control-dedicated rotational position detector is disposed on the rear side of the AC dynamo machine oppositely to the pulley 60. The resolver 20 is comprised of a rotor 21 and a stator 22. The rotor 21 is secured to the rotatable shaft 12 at an end portion 12a thereof. The stator 22 is provided with a stator winding 22a.

The resolver 20 is secured to a resolver bracket 80a by means of a retainer 24 and a screw 23 which fix the stator 22 in the axial direction. The retainer 24 is formed in an annular shape and clamped to the resolver bracket 80a by the screw 23. A cover 25 is externally provided for the resolver 20 in order to protect the resolver against invasion of foreign materials from the exterior.

Next, description will be made of operation. When an exciting current is fed to the field winding 9 through the medium of the brushes 13 and the slip rings 15, magnetic flux is generated in the rotor core 8. In a motor operation mode for starting the engine operation, a polyphase alternating current is fed to the polyphase stator winding 2 in the state mentioned above, as a result of which a turning force or torque is generated in the rotor 10 to be transmitted to the engine by way of the pulley 60 and a belt, whereby the engine is driven. At this juncture, it should be mentioned that although the pulley 60 and a poly-V belt are employed as the turning force transmitting means in the case of the instant example, a toothed belt or chain or the like may be used as the belt.

On the other hand, in the generator operation mode for supplying an electric power to vehicle-onboard electric loads, the exciting current is fed to the field winding 9 through the medium of the brushes 13 and the slip rings 15, which results in generation of the magnetic flux in the core 8. In this state, a turning force is transmitted to the rotor from the engine through the belt via the pulley 60, whereby the rotor is forced to rotate. Thus, an electric power is induced in the polyphase stator winding 2 under the action of the rotating rotor.

In the motor-vehicle-destined AC dynamo machine of the structure described above, electrical energization of the exciting winding of the stator 22 of the resolver 20 in the state in which the rotor 21 of the resolver 20 is rotating will result in generation of two-phase output voltages in the winding of the stator 22 which voltages change in conformance with a sine curve and a cosine curve, respectively. Through comparison of both voltages, the rotation angle (absolute position) can arithmetically be determined.

In the conventional motor-vehicle-destined AC dynamo machine implemented in the structure described above, the resolver 20 serving as the control-dedicated rotational position detector is so designed as to arithmetically determine the rotation angle on the basis of the voltages induced in the stator winding 22a wound around the stator 22. Consequently, when leakage flux from the AC dynamo machine 100 crosses or interlinks the stator winding 22a, it becomes impossible to detect the rotation angle with reasonable accuracy, giving rise to a problem.

The present invention has been made with a view to solving the problem mentioned above, and thus an object of the present invention is to provide a motor-vehicle-destined AC dynamo machine which is capable of detecting the rotation angle with high accuracy by reducing noise generated in the control-dedicated rotational position detector.

DISCLOSURE OF THE INVENTION

A motor-vehicle-destined AC dynamo electric machine according to this invention includes an AC dynamo machine body which is comprised of a rotor constituted by a first rotatable shaft supported rotatably by a pair of bearings, a rotor core fixedly secured to the first rotatable shaft and a field winding wound on the rotor core, a stator constituted by a stator core disposed in opposition to the rotor and a polyphase stator winding wound on the stator core and a bracket supporting the pair of bearings and the stator, and a control-dedicated rotational position detector which is comprised of a second rotatable shaft coupled to the first rotatable shaft through the medium of a large magnetic reluctance portion, a second rotor fixedly secured to the second rotatable shaft and a second stator winding for generating an output voltage based on rotation of the second rotor.

The large magnetic reluctance portion mentioned above may be realized in the form of a coupling bound through the medium of a nonmagnetic material.

Further, the large magnetic reluctance portion is implemented in the form of a diameter-reduced shaft portion disposed between the first rotatable shaft and the second rotatable shaft.

The second rotatable shaft mentioned above may be made of a nonmagnetic material.

Further, as a securing means for the control-dedicated rotational position detector, there may be employed only washers.

Furthermore, the AC dynamo electric machine body may be so disposed that bidirectional transmission of a motive power with an engine of the motor vehicle can be realized through the medium of a transmitting means such as a belt, a chain or the like and thus the AC dynamo electric machine body can operate as an electric motor for starting operation of the engine and as an electric generator for supplying an electric power to the motor vehicle.

Besides, the large magnetic reluctance portion and the control-dedicated rotational position detector may be disposed on an opposite side of the AC dynamo electric machine body relative to the transmission means.

BEST MODES FOR CARRYING OUT THE INVENTION

Embodiment 1

Figure 1:
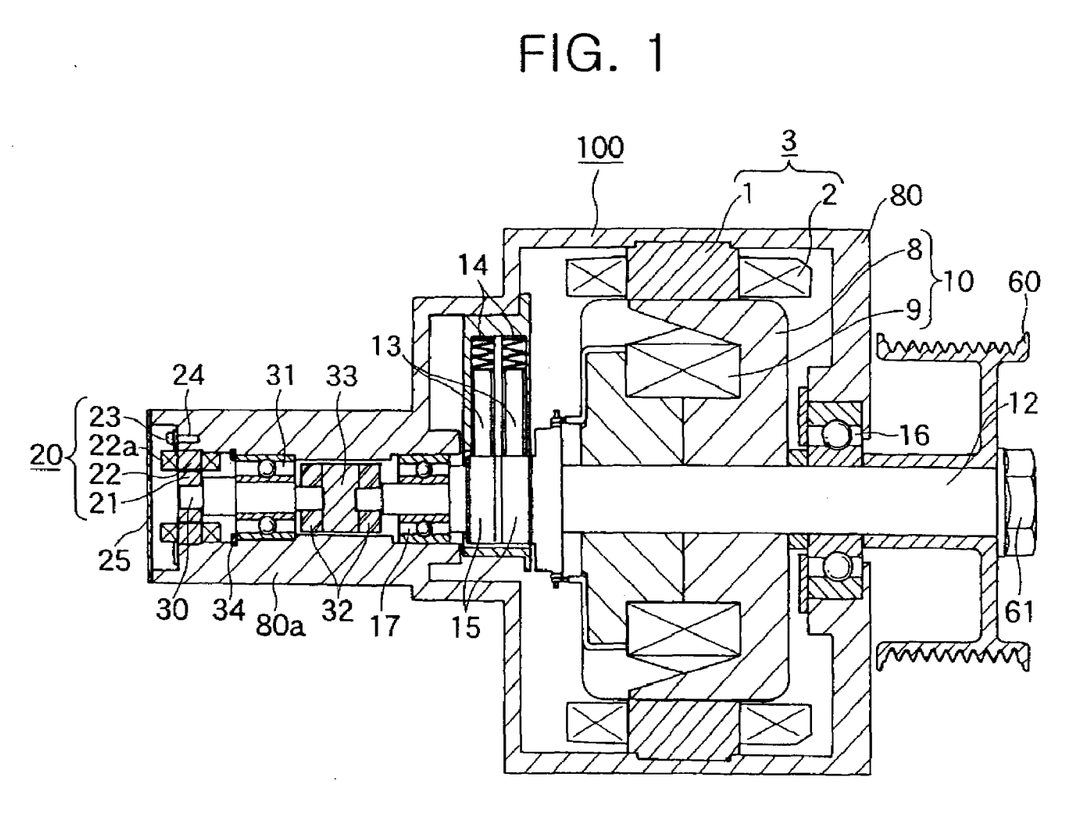
FIG. 1 is a sectional view showing an exemplary embodiment of the motor-vehicle-destined AC dynamo electric machine according to the present invention.

FIG. 1 is a sectional view showing an exemplary embodiment of the motor-vehicle-destined AC dynamo electric machine according to the present invention. This AC dynamo electric machine is equipped with a pulley 60 at one end portion thereof, as viewed in FIG. 1, for making it possible to realize bidirectional transmission of a motive power with an engine. The pulley 60 is fixedly secured to a rotatable shaft 12 serving as a first rotatable shaft at one end face portion thereof by means of a nut 61.

Mounted fixedly on the rotatable shaft 12 is a rotor core 8 which is wound with a field winding 9. The rotor core 8, the field winding 9 and the rotatable shaft 12 cooperate to constitute a rotor 10. Disposed in opposition to the rotor 10 is a stator core 1 which is wound with a polyphase stator winding 2. The stator core 1 and the polyphase stator winding 2 cooperate to constitute a stator 3.

The rotor 10 and the stator 3 are housed within a bracket 80. The rotor 10 is rotatably supported by a pair of bearings 16 and 17. The bearings 16 and 17 and the stator 3 are fixedly housed within the bracket 80. Slip rings 15 are mounted on the rotatable shaft 12 at one side thereof for the purpose of supplying or feeding the electric current to the field winding 9. A pair of brushes 13 are provided in slideable contact with the slip rings 15, respectively. Further, a brush holder is provided in which springs 14 are accommodated for pressing the brushes 13 onto the slip rings 15, respectively. The components mentioned above, i.e., the rotor 10, the stator 3, the bracket 80, the pulley 60, the slip rings 15, the brushes 13 and the springs 14 constitute an AC dynamo electric machine body 100 as the major part of the AC dynamo electric machine.

Further, a resolver 20 designed to serve as a control-dedicated rotational position detector (i.e., rotational position detector for the control purpose) is disposed on the rear side of the AC dynamo electric machine body 100 oppositely relative to the pulley 60. The resolver 20 is comprised of a rotor 21 serving as a second rotor and a stator 22 serving as a second stator. The stator 22 includes a stator winding 22a serving as a second stator winding. The output of the resolver 20 is very low on the order of 2 to 3 V and does not operate as the electric generator. The resolver 20 constitutes the control-dedicated rotational position detector, i.e., a pickup device for the AC dynamo electric machine body 100.

The rotor 21 is fixedly secured to a rotatable shaft 30 serving as a second rotatable shaft. The rotatable shaft 30 is rotatably supported by means of a bearing 31 which is fixedly secured to a resolver bracket 80a by means of a snap ring 34. The rotatable shaft 30 may be made of a nonmagnetic metal such as stainless steel, copper, aluminum or the like.

The first rotatable shaft 12 and the second rotatable shaft 30 are coupled to each other by a coupling 32 which is filled with or bound by a mass of nonmagnetic material 33 such as stainless steel. The material 33 cooperates with the coupling 32 to constitute a large magnetic resistance or reluctance portion for decreasing the magnetic flux leakage from the first rotatable shaft 12 to the second rotatable shaft 30.

The resolver 20 is fixedly secured to the resolver bracket 80a by means of a retainer 24 and a screw(s) 23 which cooperate to secure the stator 22 stationarily in the axial direction. The retainer 24 is formed in an annular shape and clamped to the resolver bracket 80a by the screw(s) 23. A cover 25 is provided externally of the resolver 20 for protecting the resolver 20 against invasion of foreign materials from the exterior.

As is apparent from the above, it can be said that the motor-vehicle-destined AC dynamo electric machine according to the instant embodiment of the invention comprises the AC dynamo machine body 100 which is composed of the rotor 10 constituted by the first rotatable shaft 12 supported rotatably by a pair of bearings 16 and 17, the rotor core 8 fixedly secured to the first rotatable shaft 12 and the field winding 9 wound around the rotor core 8, the stator 3 constituted by the stator core 1 disposed in opposition to the rotor 10 and the polyphase stator winding 2 wound around the stator core 1, and the bracket 80 supporting the pair of bearings 16 and 17 and the stator 3, and the resolver 20 which is composed of the second rotatable shaft 30 coupled to the first rotatable shaft 12 through the medium of the large magnetic reluctance portion, the second rotor 21 fixedly secured to the second rotatable shaft 30 and the second stator winding 22a for generating an output voltage based on the rotation of the second rotor 21. In the field winding type dynamo electric machine described above, the magnetic flux crossing or interlinking the stator winding 22a of the resolver 20 is decreased by the large magnetic reluctance portion disposed between the first rotatable shaft 12 and the second rotatable shaft 30, whereby noise generated internally of the resolver 20 can be reduced, whereby the rotation angle can be detected with high accuracy.

Further, the large magnetic reluctance portion is constituted by the coupling 32 filled with or bound by a mass of nonmagnetic material 33. As a consequence, the magnetic flux interlinking or crossing the stator winding 22a of the resolver 20 is decreased by the nonmagnetic material 33 disposed between the first rotatable shaft 12 and the second rotatable shaft 30 to serve as the magnetic resistance or reluctance, whereby noise generated in the resolver 20 can be reduced with reliability, which in turn means that the rotation angle can be detected with significantly enhanced accuracy.

Further, the second rotatable shaft 30 is made of a nonmagnetic material. By virtue of the feature that the second rotatable shaft 30 having the rotor 21 of the resolver 20 mounted thereon is made of the nonmagnetic material, i.e., a nonmagnetic metal or a resin, the second rotatable shaft 30 forms no part of magnetic circuit, which in turn means that the magnetic flux interlinking or crossing the stator winding 22a of the resolver 20 is decreased, as a result of which noise generated internally of the resolver 20 can be reduced, whereby the rotation angle can be detected with further enhanced accuracy and reliability.

The AC dynamo machine body 100 is so disposed that bidirectional transmission of the motive power with the engine of the motor vehicle can be realized through the medium of the transmitting means such as a belt and a pulley or the like and thus the AC dynamo machine body can operate as the electric motor for starting the engine operation and as the electric generator for supplying the electric energy to the motor vehicle. In the motor operation mode of the AC dynamo machine body 100 for starting the engine operation as well as in the generator operation mode for power supply to the motor vehicle, the magnetic flux crossing or interlinking the stator winding of the control-dedicated rotational position detector is decreased. Thus, noise generated internally of the resolver 20 can be reduced, whereby enhanced controllability can be ensured for the motor vehicle.

The large magnetic reluctance portion and the resolver 20 are disposed on the side opposite to the transmitting means such as the pulley 60 and others of the AC dynamo machine body 100. Thus, the space required for installation of the resolver 20 can easily be assured. Further, because of the possibility of disposing both the first rotatable shaft 12 and the second rotatable shaft 30 on and along one and the same axis, the structure of the resolver 20 can be simplified.

Incidentally, although it has been described in conjunction with the instant embodiment of the invention that the nonmagnetic material 33 is a stainless steel or the like, it may be a nonmagnetic metal such as copper, nonmagnetic metal or alternatively air, resin or the like. At this juncture, it should be added that when the air is used as the nonmagnetic material 33, the coupling 32 may be implemented in the form of a cylinder having bottoms at both ends, respectively.

Further, although the large magnetic reluctance portion and the resolver 20 are disposed on the opposite side relative to the transmitting means in the AC dynamo machine according to the instant embodiment of the invention, it should be appreciated that they may be disposed on the same side as the transmitting means, i.e., on the front side of the AC dynamo machine body, although it depends on availability of the space and the appropriate interconnecting mechanism.

Embodiment 2

Figure 2:
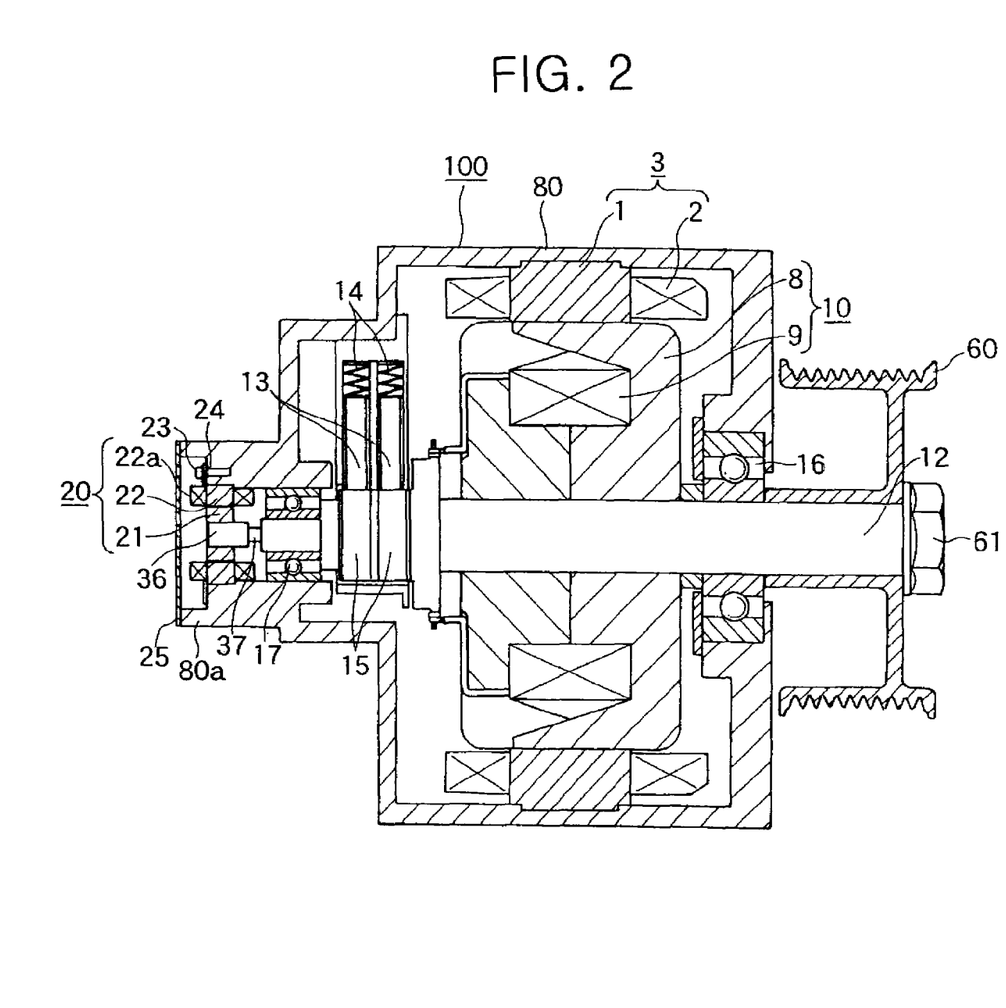
FIG. 2 is a sectional view showing another exemplary embodiment of the motor-vehicle-destined AC dynamo electric machine according to the present invention.

FIG. 2 is a sectional view showing another exemplary embodiment of the motor-vehicle-destined AC dynamo electric machine according to the present invention. In the case of the motor-vehicle-destined AC dynamo electric machine according to the instant embodiment of the invention, the first rotatable shaft 12 is so formed as to extend on the opposite side relative to the pulley 60 to thereby form a second rotatable shaft 36. A diameter-reduced shaft portion 37 is provided between the first rotatable shaft 12 and the second rotatable shaft 36 to serve as a large magnetic resistance or reluctance portion. The diameter-reduced shaft portion 37 serves to decrease the magnetic flux leakage from the first rotatable shaft 12 to the second rotatable shaft 30.

With regard to the other structural respects, the instant embodiment is essentially identical as the first embodiment.

As is apparent from the above, the large magnetic reluctance portion is constituted by the diameter-reduced shaft portion 37 disposed between the first rotatable shaft 12 and the second rotatable shaft 36. Thus, the magnetic flux crossing or interlinking the stator winding 22a of the resolver 20 is decreased by the diameter-reduced shaft portion 37 disposed between the first and second rotatable shafts 12 and 36, whereby noise generated in the resolver 20 can be reduced. Thus, the rotation angle can be detected with enhanced accuracy and reliability. Since the large magnetic reluctance portion is constituted by the diameter-reduced shaft portion 37, designing of the AC dynamo machine can be facilitated. Besides, the AC dynamo machine can be implemented compactly without increasing the overall length.

Embodiment 3

Figure 3:
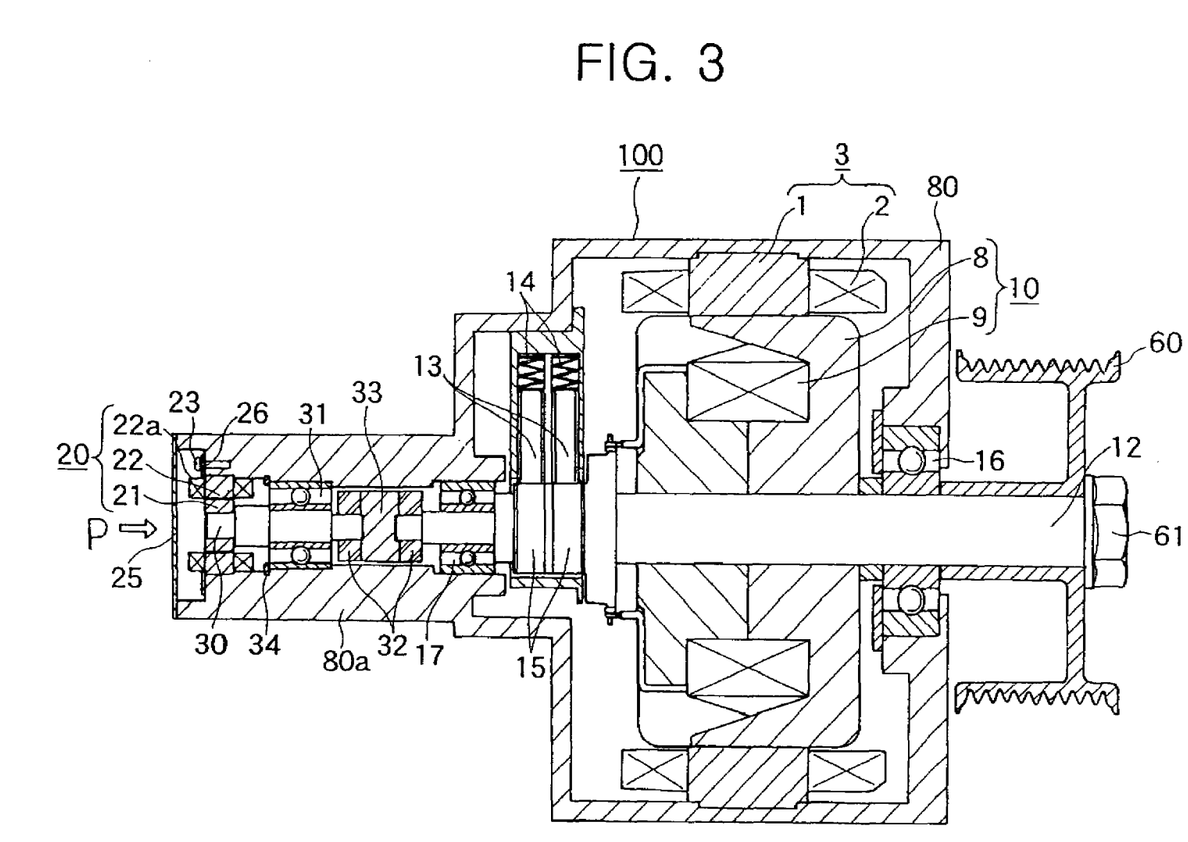
FIG. 3 is a sectional view showing yet another exemplary embodiment of the motor-vehicle-destined AC dynamo electric machine according to the present invention.
Figure 4:
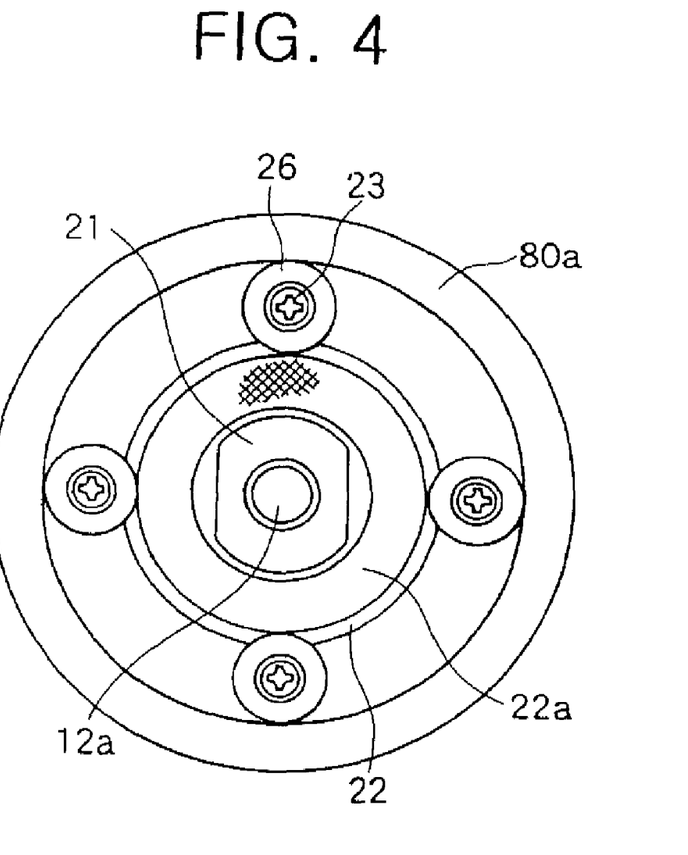
FIG. 4 is a view taken in the direction indicated by an arrow P in FIG. 3.

FIG. 3 is a sectional view showing yet another embodiment of the motor-vehicle-destined AC dynamo machine according to the present invention. FIG. 4 is a view of the same, as viewed in the direction indicated by an arrow P in FIG. 3. In the AC dynamo machine according to the instant embodiment of the invention, the stator 22 of the resolver 20 is fixedly secured to the resolver bracket 80a with the core portion of the stator 20 being pressed by washers 26 and secured by screws 23. In other words, fixedly securing of the resolver 20 is realized only with the washers 26 without using the snap ring or annular retainer which is employed in the AC dynamo machine according to the first embodiment of the invention and the conventional machine. Since no load is applied to the resolver 20 in the axial direction, the resolver can be secured with sufficient rigidity only with the washers 26.

With regard to the other structural respects, the instant embodiment is essentially identical as the first embodiment.

As is apparent from the above, in the motor-vehicle-destined AC dynamo machine according to the instant embodiment of the invention, only the washers 26 are employed as the securing or fixing means for the resolver 20. Since the retainer is spared, the number of parts can correspondingly be decreased while the working performance in assembling can be enhanced. Further, the material cost can also be reduced.

INDUSTRIAL APPLICABLITY

The present invention has provided the motor-vehicle-destined AC dynamo machine which includes an AC dynamo machine body which is comprised of the rotor constituted by the first rotatable shaft supported rotatably by a pair of bearings, the rotor core fixedly secured to the first rotatable shaft and the field winding wound on the rotor core, the stator which is constituted by the stator core disposed in opposition to the rotor and the polyphase stator winding wound on the stator core and the bracket supporting the pair of bearings and the stator, and the control-dedicated rotational position detector constituted by the second rotatable shaft coupled to the first rotatable shaft through the medium of the large magnetic reluctance portion, the second rotor fixedly secured to the second rotatable shaft and the second stator winding for generating an output voltage based on rotation of the second rotor. In the case of the field winding type dynamo electric machine, the rotor core having the field winding wound thereon is fixed to the rotatable shaft. Thus, when the field current is fed to the field winding to generate the magnetic flux in the rotor core, then leakage flux makes appearance in the flux path formed by the rotatable shaft to cross or interlink the stator winding of the control-dedicated rotational position detector, providing a cause for noise generation. By contrast, in the AC dynamo machine according to the present invention, the magnetic flux crossing or interlinking the stator winding of the control-dedicated rotational position detector is decreased by the large magnetic resistance or reluctance portion disposed between the first and second rotatable shafts, as is apparent from the foregoing, whereby noise generated internally of the control-dedicated rotational position detector is reduced. Thus, the rotation angle can be detected with enhanced accuracy and reliability.

In the AC dynamo machine, the large magnetic resistance or reluctance portion can be constituted by the coupling bound through the medium of a mass of nonmagnetic material. Owing to this arrangement, the magnetic flux crossing or interlinking the stator winding of the control-dedicated rotational position detector is decreased by the mass of nonmagnetic material disposed between the first and second rotatable shafts and serving as the magnetic resistance or reluctance, whereby noise generated internally of the control-dedicated rotational position detector can be reduced, which means in turn that the rotation angle can be detected with significantly enhanced accuracy.

Further, the large magnetic resistance or reluctance portion can be implemented in the form of the diameter-reduced shaft portion disposed between the first rotatable shaft and the second rotatable shaft. With this arrangement, the magnetic flux crossing or interlinking the stator winding of the control-dedicated rotational position detector is decreased by the diameter-reduced shaft portion disposed between the first and second rotatable shafts, whereby noise generated in the control-dedicated rotational position detector can be reduced. Thus, the rotation angle can be detected with further enhanced accuracy. Besides, the magnetic reluctance portion can easily be provided. Additionally, the AC dynamo machine can be implemented compactly without increasing the overall length thereof.

The second rotatable shaft can be made of a nonmagnetic material. Owing to the feature that the second rotatable shaft onto which the rotor of the control-dedicated rotational position detector is fixedly secured is made of the nonmagnetic material, i.e., a nonmagnetic metal or a resin, the second rotatable shaft constitutes no part of the magnetic circuit, which means that the magnetic flux interlinking or crossing the stator winding of the control-dedicated rotational position detector is decreased. As a result of this, noise generated in the control-dedicated rotational position detector can be reduced, whereby the rotation angle can be detected with further enhanced accuracy and reliability.

As the securing means for the control-dedicated rotational position detector, there can be employed only the washers. With the arrangement that only the washers are employed as the securing or fixing means for the control-dedicated rotational position detector, the retainer can be omitted. Thus, the number of parts can correspondingly be decreased while the working performance in assembling can be improved. Further, the material cost can be reduced as well.

Further, the AC dynamo machine body can be so disposed that the bidirectional transmission of a motive power with the engine of the motor vehicle can be realized through the medium of the transmitting means such as the belt, the chain or the like and thus the AC dynamo machine body is capable of operating as the electric motor for starting the engine operation and as the electric generator for supplying the electric power to the motor vehicle. By virtue of the feature described just above, the magnetic flux crossing or interlinking the stator winding of the control-dedicated rotational position detector can be decreased in the motor operation mode of the AC dynamo machine body for starting the engine operation as well as in the generator operation mode for power supply to the motor vehicle. Thus, noise generation in the control-dedicated rotational position detector can be reduced, whereby enhanced controllability can be ensured for the motor vehicle.

Furthermore, the large magnetic resistance or reluctance portion and the control-dedicated rotational position detector can be disposed on the opposite side of the AC dynamo machine body relative to the transmitting means. In general, the pulley or the like which serves as the transmitting means is disposed on the front side of the AC dynamo machine body and thus difficulty is ordinarily encountered in ensuring a space for disposing the control-dedicated rotational position detector and installing the connecting means for connecting the control-dedicated rotational position detector and the AC dynamo machine body to each other. However, by disposing the control-dedicated rotational position detector on the side opposite to the transmitting means, the space required for installation of the control-dedicated rotational position detector can easily be assured. Further, because both the first rotatable shaft and the second rotatable shaft can be disposed on and along one and the same axis, the structure of the control-dedicated rotational position detector can be simplified.

The invention claimed is:

1. An AC dynamo electric machine for a motor vehicle, the AC dynamo electric machine comprising:
   an AC dynamo machine body comprising:
      a rotor comprised of a first rotatable shaft supported rotatably by a pair of bearings, a rotor core fixedly secured to said first rotatable shaft and a field winding wound on said rotor core,
      a stator comprised of a stator core disposed in opposition to said rotor and a polyphase stator winding wound on said stator core, and
      a bracket supporting said pair of bearings and said stator, and a rotational position detector comprising:
      a second rotatable shaft,
      a large magnetic reluctance portion through which said second rotatable shaft is coupled to said first rotatable shaft,
      a second rotor fixedly secured to said second rotatable shaft, and
      a second stator winding for generating an output voltage based on rotation of said second rotor, wherein said large magnetic reluctance portion comprises a shaft portion which is disposed between said first rotatable shaft and said second rotatable shaft and has a diameter which is smaller than a diameter of said first rotatable shaft and a diameter of said second rotatable shaft, and wherein the large magnetic reluctance portion, the first rotatable shaft and the rotatable shaft constitute a single member.

2. The AC dynamo electric machine for a motor vehicle set forth in claim 1, wherein said AC dynamo machine body is so disposed that bidirectional transmission of a motive power with an engine of said motor vehicle can be realized through the medium of transmitting means comprising a belt or a chain and that said AC dynamo machine body is capable of operating as an electric motor for starting operation of said engine and as an electric generator for supplying an electric power to said motor vehicle.

3. The AC dynamo electric machine for a motor vehicle set forth in claim 2, wherein said large magnetic reluctance portion and said rotational position detector are disposed on an opposite side of said AC dynamo machine body relative to said transmitting means.

* * * * *